(12) United States Patent
Marko (10) Patent No.: US 10,670,692 B1
(45) Date of Patent: Jun. 2, 2020

(54) ULTRA WIDE-BAND SPECTRUM SHARING AND SYNCHRONIZATION

(71) Applicant: Sirius XM Radio Inc., New York, NY (US)

(72) Inventor: Paul Marko, Pembroke Pines, FL (US)

(73) Assignee: Sirius XM Radio Inc., New York, NY (US)

( * ) Notice: Subject to any disclaimer, the term of this patent is extended or adjusted under 35 U.S.C. 154(b) by 0 days.

(21) Appl. No.: 15/720,544

(22) Filed: Sep. 29, 2017

Related U.S. Application Data (60) Provisional application No. 62/402,682, filed on Sep. 30, 2016.

(51) Int. Cl.
| | |
|---|---|
| G01S 5/14 | (2006.01) |
| H04B 1/7183 | (2011.01) |
| G01S 5/02 | (2010.01) |
| H04B 1/719 | (2011.01) |

(52) U.S. Cl.
CPC ............ *G01S 5/145* (2013.01); *G01S 5/0226* (2013.01); *H04B 1/719* (2013.01); *H04B 1/7183* (2013.01); *G01S 5/0263* (2013.01); *H04B 2201/71638* (2013.01)

(58) Field of Classification Search
CPC ...... G01S 5/145; G01S 5/0226; G01S 5/0263; H04B 1/719; H04B 1/7183; H04B 2201/71638
USPC ........................ 455/41.2, 454, 502, 208, 265
See application file for complete search history.

(56) References Cited

U.S. PATENT DOCUMENTS

| | | | |
|---|---|---|---|
| 7,072,671 B2 * | 7/2006 | Leitch ................... | G01S 5/0289 342/450 |
| 2005/0025089 A1 * | 2/2005 | Walker ................. | H04H 20/106 370/323 |
| 2015/0200706 A1 * | 7/2015 | Bottazzi ................... | G01S 7/40 375/140 |

* cited by examiner

*Primary Examiner* — Michael Y Mapa
(74) *Attorney, Agent, or Firm* — Kramer Levin Naftalis & Frankel LLP (57) ABSTRACT

Systems and methods are presented for sharing the ultra-wide band ("UWB") spectrum. The systems and methods can include allocating a designated time slice for UWB position determination signals on a primary basis to ensure that the UWB transmissions would be free of interference. The systems and methods can also include synchronizing a plurality of UWB transceivers and emitting synchronized pulses, during the designated time slice.

10 Claims, 6 Drawing Sheets

ULTRA WIDE-BAND SPECTRUM SHARING AND SYNCHRONIZATION

CROSS-REFERENCE TO RELATED APPLICATION

This application claims the benefit of U.S. Provisional Patent Application No. 62/402,682, filed on Sep. 30, 2016, the contents of which are incorporated herein by reference in their entireties.

TECHNICAL FIELD

The present subject matter relates to vehicle position determination in areas where GPS signals are weak (such as "urban canyons"), and more particularly, to systems and methods for sending signals during designated slices of time in the ultra wide-band ("UWB") spectrum to synchronize a set of UWB transceiver sites, including those located in locales where GPS signals are weak or unavilable.

BACKGROUND

Urban areas often have poor Global Positioning System (GPS) reception in their core areas, where tall buildings are situated along both sides of nearly every street or roadway. For example, while GPS works well for the highways approaching New York City, as a vehicle actually gets into New York City, numerous obstructions prevent the receipt of satellite signals. Such areas are often known as "urban canyons." Similar effects are known in other major metropolitan centers.

Currently, vehicles rely on the availability of accurate GPS signals for position determination. Where such signals cannot be received, alternate solutions must be utilized.

One possible solution that has been proposed is a 2.4 gigahertz solution, using 10 MHz of bandwidth to transmit pulses that could be used to calculate position in such urban areas. However, such a small bandwidth would define the accuracy, and the accuracy with 10 MHz of bandwidth is generally poor, on the order of 6-10 meters. This level of accuracy makes it inadequate to predict accidents or to even know what lane one is in. V2V can support multiple safety apps to warn of pending accidents, including Forward Collision Warning, Emergency Electronic Brake Light, Intersection Movement Assist, Do Not Pass Warning and Left Turn Assist, and having accurate position data is critical for these technologies to work.

What is needed in the art are alternate ways of providing position information to vehicles that can facilitate accuracy to 1 meter or less, and preferably to accuracies within centimeters, especially in areas where GPS signals are weak or unavailable.

BRIEF DESCRIPTION OF THE DRAWINGS

The present subject matter will be more readily understood with reference to various exemplary embodiments thereof, as shown in the drawing figures, in which.

SUMMARY

A novel scheme for sharing the ultra-wide band ("UWB") spectrum is presented. In exemplary embodiments of the present subject matter, a regular time slot can be allocated to UWB position determination signals on a primary basis. For example, in some embodiments, the regular time slot can be a 20 msec interval during every half second (500 msec). The regular time slot can ensure that during that small fraction of time (e.g., 20 msec out of every half-second), UWB transmissions would be free of interference. Using such a novel time sharing system, methods to synchronize a plurality of deployed UWB transceivers in an urban canyon, or other area where GPS signals are weak or unavailable, or corrupted, are also presented. These methods to synchronize a plurality of UWB transceivers can be implemented independent of whether or not the time sharing system is deployed. In exemplary embodiments of the present subject matter, one of a plurality of sites can be designated as a master site. The master site can acquire a GPS or Satellite Digital Audio Radio Service (SDARS) signal, for example, so as to align with absolute time. It can then send a time slot signal (e.g., 20 msec) via UWB (e.g., at 0.48 and 0.98 of every second (i.e., at 480-500 msec, and at 980-1000 msec)). The remaining sites in that vicinity (e.g., can receive signals from the master site) can be designated as slave sites, each of which deriving their timing from, and synchronizing to, the master site. Using these methods, in some embodiments, all UWB sites in the geographical area can be synchronized to each other, and emit synchronized pulses, all during the slices of each second during which UWB position transmissions are the primary use, according to the UWB spectrum sharing plan described above. With a UWB pulse width of 1 nanosecond, in most reception environments vehicles receiving these pulses can calculate their respective positions to within 1 cm accuracy, by calculating the time of flight from each received site's pulse train, whose positions are already known. Because vehicles are passive in this approach, and do not need to transmit back to the transmitting sites, the only signals primarily operative during the time slot (e.g., 20 msec intervals of each half-second) are the UWB transmissions from the sites, and due to their having priority under the time sharing of the spectrum, these signals will not be subject to or introduce significant interference into other services sharing the band.

In some embodiments, the present subject matter provides a method of sharing the ultra-wideband ("UWB") spectrum that divides a time variable into multiple unit intervals. For each unit interval, the method can designate one or more fractional time intervals of the unit interval where UWB devices are the primary use. The method can also designate the remaining portions of the unit interval as time intervals when other services are the primary use, and UWB devices have secondary use. These time intervals can be designated such that during the fractional time intervals where UWB devices are the primary use, these devices can utilize the entire ultra-wide bandwidth without interference from other users of the UWB spectrum.

In some embodiments, the unit interval is one second, and the fractional time intervals are two 20 msec intervals. In some embodiments, the two 20 msec intervals occur at 480 msec through 500 msec, and at 980 msec through 1 sec, out of every second.

In some embodiments, the one or more fractional time intervals occur at a defined period. In some embodiments, the UWB devices transmit position determination pulse trains during the primary use intervals.

The present subject matter also provides a method of transmitting synchronized UWB position determination signals that includes a first stage in which course synchronization is accomplished at a master UWB transmitter site; and a second high resolution synchronization stage wherein one nanosecond pulses are used from the master site out to synchronize one or more UWB slave sites.

In some embodiments, the master site can acquire GPS time in the first stage. In some embodiments, the master site acquires a timing signal from an SDARS service in the first stage, either from a satellite, or a terrestrial repeater.

In some embodiments, the second stage one nanosecond pulses can be sent from the master site out to resynchronize the slave sites in a "daisy chain" manner. In some embodiments, the nanosecond pulses sent by each of the master and slave sites can be differentiated one from another such that a receiver can distinguish which site is transmitting which set of pulses.

In some embodiments, one or more slave sites each are provided with the co-ordinates of the master site and all other slave sites, and upon receiving the pulses from either the master or another slave site, each can calculate when the pulses were sent by their originating site.

In some embodiments, the nanosecond pulses sent by each site can be distinguished from one another by varying the time intervals between successive pulses. In some embodiments, the pulse trains can be sent during a time interval when UWB devices have primary use of the UWB spectrum, pursuant to a time sliced spectrum sharing schema.

In some embodiments, the synchronization level can be minimized for each slave site in order to reduce the buildup of timing errors from each transmission path. In some embodiments, one or more of the slave sites can be configured to average the reception time from the master or from other slave sites over multiple reception windows to reduce jitter in the transmit timing.

In some embodiments, the synchronization paths for the one or more slave sites can be defined during the network planning phase and stored in or downloaded to each site. In some embodiments, the synchronization paths for the one or more save sites can be defined dynamically using self-organizing algorithms. In some embodiments, the synchronization level should be minimized for each slave site to reduce the buildup of timing errors from each transmission path.

A system for providing position determination signals to vehicles in an area where GPS signals are unavailable or weak is also provided by the present subject matter. The system can include a master UWB transmission site that includes at least one of a GPS or a SDARS receiver; and a plurality of UWB transceiver slave sites. In some embodiments, the master site can align its transmissions with UTC or GPS time, and sends pulse trains to the plurality of UWB transceiver slave sites. The slave sites can, in some embodiments, each further transmit their own pulse trains, precisely synchronized to the pulse train transmissions of the master site, directly or indirectly, to within a defined accuracy. In some embodiments, the site to site launch timing of UWB transmissions is aligned to better than 2 nsec.

In some embodiments, the system can also include one or more vehicles, each receiving the transmissions from three or more of the master and slave sites, and using the transmissions to calculate their positions to within a defined accuracy.

In some embodiments, in synchronizing to the master site or to another slave site, one or more of the slave sites can be configured to average the reception time from the master or from other slave sites over multiple reception windows to reduce jitter in the transmit timing.

In some embodiments, synchronization paths for the one or more slave sites from the master can be defined during the network planning phase and stored in or downloaded to each site, or can be defined dynamically using self-organizing algorithms. In some embodiments, a synchronization level can be minimized for each slave site to reduce the buildup of timing errors from each transmission path.

The present subject matter also provides a system and method that can provide location information on one or more UWB transmitters/transceivers to one or more UWB receivers/transceivers in a matrix to enable the receivers/transceivers to generate position data. In some embodiments, the system and method can provide the location information from at least one of: a SDARS broadcast, a WiFi communication, vehicle to vehicle communications, information pre-stored in a memory in the vehicle, a preloaded table, information contained in the UWB transmission, or other UWB communications.

In some embodiments, any two UWB transmitters in the matrix can be synchronized to nanosecond accuracy. In some embodiments, the matrix of UWB transmitters are configured to send out synchronous pulses. In some embodiments, a vehicle receiving UWB transmissions can be configured to measure timing differences between the receptions of various signals and precisely determine where it is to a one centimeter accuracy.

DETAILED DESCRIPTION

General Overview—Ultra Wideband Communications

A significant difference between conventional radio transmissions and UWB is that conventional systems transmit information by varying the power level, frequency, and/or phase of a sinusoidal wave. UWB transmissions can transmit information by generating radio energy at specific time intervals and occupying a large bandwidth, thus enabling pulse-position or time modulation. The information can also be modulated on UWB signals (pulses) by encoding the polarity of the pulse, its amplitude and/or by using orthogonal pulses. While UWB pulses can be sent sporadically at relatively low pulse rates to support time or position modulation, they may also be sent at rates up to the inverse of the UWB pulse bandwidth. It is noted that pulse-UWB systems have been demonstrated at channel pulse rates in excess of 1.3 gigapulses per second using a continuous stream of UWB pulses (Continuous Pulse UWB or C-UWB), supporting forward error correction encoded data rates in excess of 675 Mbit/s.

A valuable aspect of UWB technology is the ability for a UWB radio system to determine the "time of flight" of the transmission at various frequencies. This helps overcome multipath propagation, as at least some of the frequencies have a line-of-sight trajectory. With a cooperative symmetric two-way metering technique, distances can be measured to high resolution and accuracy by compensating for local clock drift and stochastic inaccuracy.

Another feature of pulse-based UWB is that the pulses can be very short (for example, less than 60 cm for a 500 MHz-wide pulse, or less than 23 cm for a 1.3 GHz-bandwidth pulse)—so that most signal reflections do not overlap the original pulse, and there is no multipath fading of narrowband signals.

In exemplary embodiments of the present subject matter, a vehicle outside an urban canyon can generally rely on receiving GPS signals to fix its location, and as it approaches the urban canyon a set of UWB transceivers may be provided in the area, so that the vehicle can then receive UWB transmissions and use those to fix its location. The following description details how the UWB transceivers may be provided in a given area, and how, by synchronizing to objective time, the UWB spectrum can be shared by carving out a small fraction of every second in which UWB position signals have priority, such that when the contemplated UWB signals are sent highly accurate positions of each vehicle may then be calculated.

It is noted that present FCC rules allow UWB devices to have access to the spectrum only on a secondary basis. Thus, compliant UWB devices may use the UWB spectrum, but are subject to the following conditions: (i) the UWB device may not cause harmful interference, and (ii) the UWB device must accept any interference received, including interference that may cause undesired operation. These rules tend to limit major investment in UWB infrastructure deployments as the UWB systems cannot be guaranteed to continue to operate in the future due to interference from other devices (also operating under the rules) and may be required to shut down if a new or existing spectrum operator claims interference from UWB transmitters.

Figure 1:
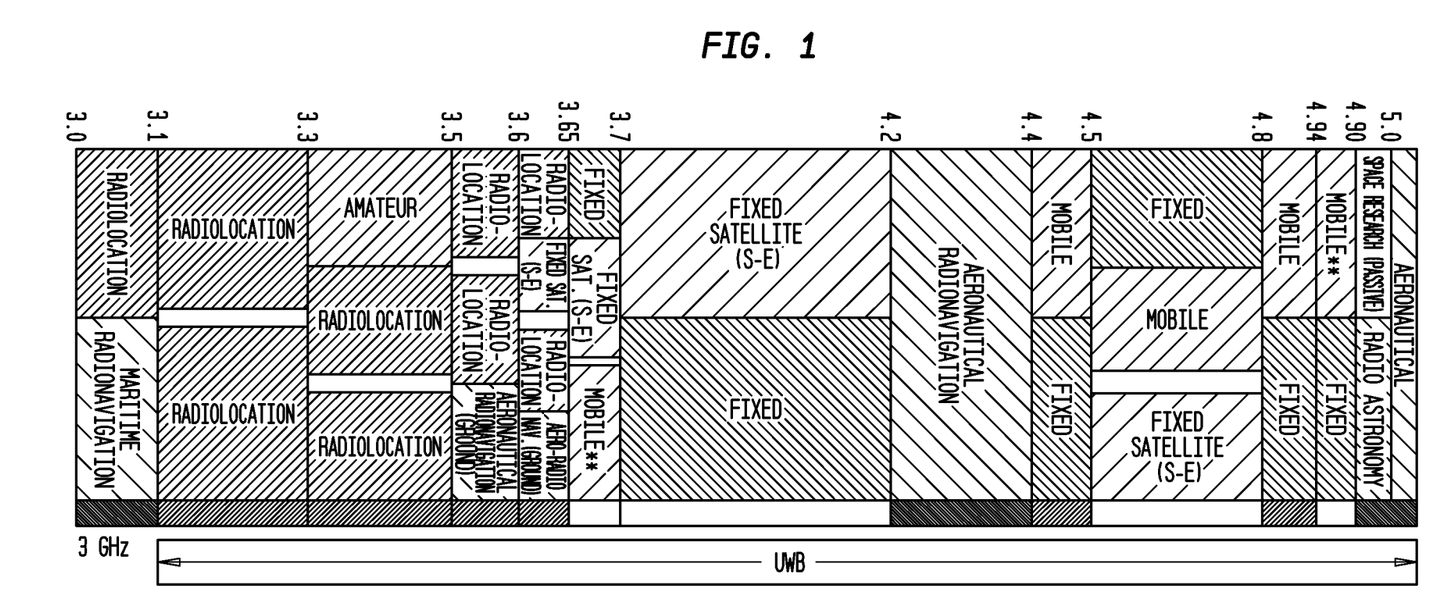
FIG. 1 illustrate the existing US spectrum allocation for the ultra-wide band, 3.0 to 5.3 GHz, and an exemplary UWB spectrum utilization at 3.1 to 5.3 GHz according to an exemplary embodiment of the present subject matter.

FIG. 1 depicts the present spectrum allocation for 3 to 5.3 GHz, the ultra-wide band. As can be seen in FIG. 1, this spectrum comprises multiple frequency bands which have been allocated for different purposes. While presently the 3 to 5.3 GHz frequency band has limited utilization which minimizes the possibility of interference, this could change in the future. In a worst case scenario, an under-utilized spectrum band in the 3 to 5.3 GHz range may be reallocated to a large wireless broadband service provider and a resultant new nationwide build out will create a high probability of interference with UWB infrastructure deployments operating in-band.

Thus, in order to promote investment in value-added UWB deployments, an approach is needed (and provided herein) to share the 3 to 5.3 GHz frequency band with UWB in a manner that can protect against future interference of UWB devices.

It is noted that two UWB transceivers can very accurately determine the distance between each other to centimeter-level accuracy based upon a pulse that has a bandwidth of two gigahertz, as shown in FIG. 1.

Time Sharing of UWB Spectrum on Primary Basis

Figure 2:
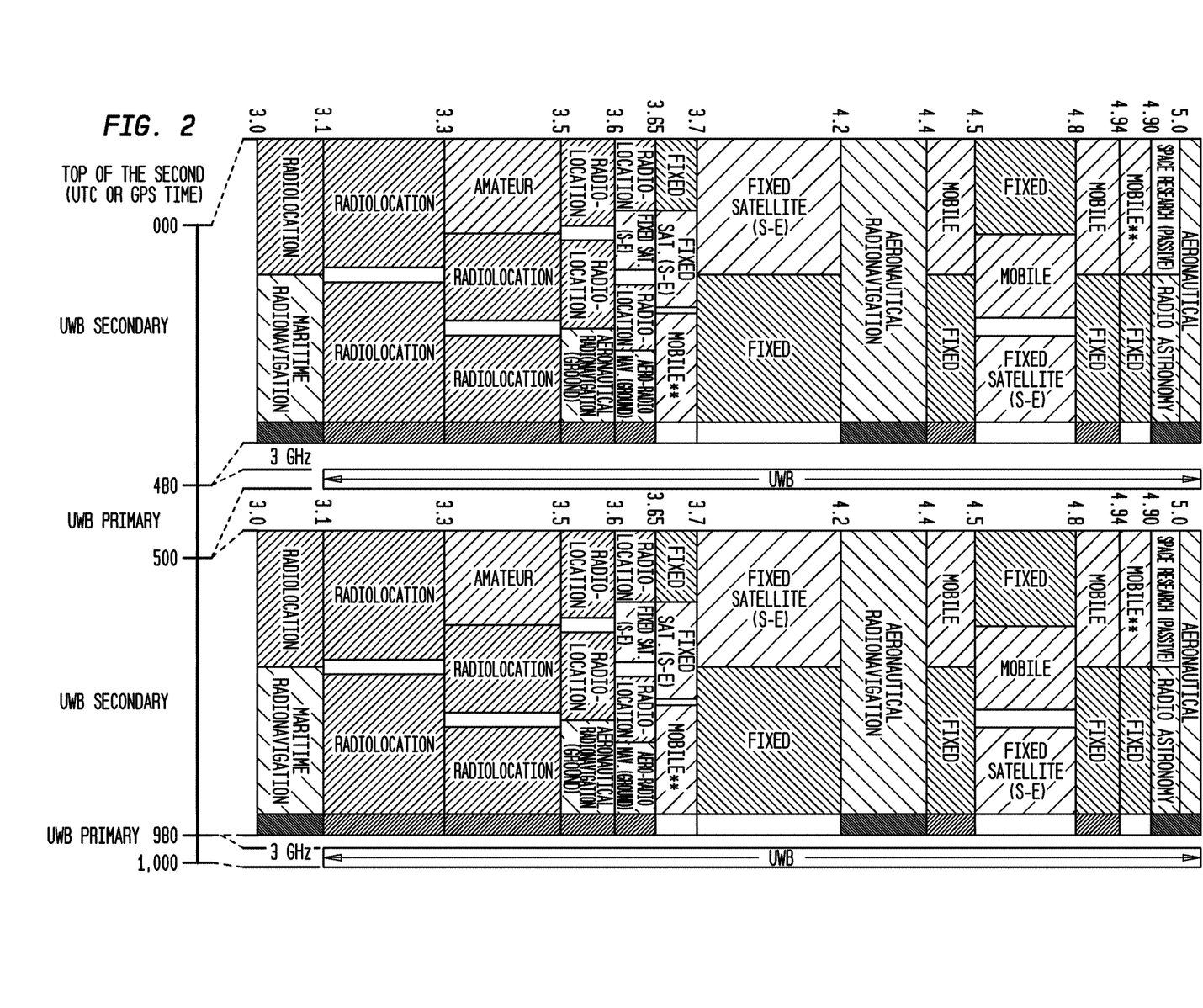
FIG. 2 illustrates an exemplary time divided UWB spectrum sharing plan according to an exemplary embodiment of the present subject matter.

FIG. 2 shows a time sliced spectrum coordination plan for UWB deployments according to exemplary embodiments of the present subject matter. In the proposed plan, the 3-5.3 GHz frequency band can be time sliced between the existing allocated spectrum users and UWB users. UWB users would have primary access during UWB specified time slots and secondary access (as they now do generally) during non-UWB time slots. The time slots can be aligned with UTC time or GPS time, for example. As shown in FIG. 2, the first 480 milliseconds at the top of the second is assigned to allocated spectrum users on a primary basis. The time slot from 480 to 500 milliseconds would be allocated to UWB users on a primary basis. The timeslot from 500-980 milliseconds is then also assigned to the allocated spectrum users on a primary basis and the time slot from 980 to 1000 milliseconds at the end of a second would also be allocated to UWB users on a primary basis. The proposed time slot timing would repeat every second. Thus, the novel UWB primary service time slots would only occupy 40 msec out of every second. Of course, alternate time slicing arrangement s are possible, this one being only exemplary.

UWB receivers may benefit from the time sliced transmissions by turning the receiver off during non-UWB time slots, thus reducing power consumption. The UWB receiver may acquire synchronization with the time slots from GPS, SDARs or from reception of valid UWB transmissions.

This proposed spectrum coordination plan, based on a priority use for only 40 milliseconds out of every second, provides for spectrum sharing that reduces the probability for future interference issues and also removes barriers for major investment in value-added UWB technology deployment. Any major new deployments by new or existing spectrum holders would follow the proposed time slot allocations to eliminate any overlap of primary spectrum use. Most broadband systems already use time slot systems for spectrum access and could be adapted to comply with the coordination plan. Existing deployments would be required to conform to the new primary spectrum use rules. As previously discussed, these deployments are presently limited and unlikely to encounter interference issues with UWB deployments.

Synchronization of UWB Transmission Sites

In exemplary embodiments of the present subject matter, a synchronization system may be provided that uses the transmitted pulse itself to synchronize. It is noted that even if a wired network was attempted to be used for this purpose, it would remain very difficult to obtain nanosecond accuracy with any wired network, and even if achieved, it would be very difficult and expensive to maintain.

Thus, in exemplary embodiments of the present subject matter, a wireless synchronization method may be used. The method includes a master site that can be provided with a GPS signal so that it will know absolute time, and thus when the top of the (absolute) second is, so that in turn it can precisely time its outgoing pulse. The master site can, for example, send two outgoing pulses per second based upon its GPS time (as shown in FIG. 2). It is noted that only the master site really needs to have the GPS signal. Alternatively, the master site can also obtain absolute time from an SDARS signal, by using the SDARS signal's master frame synchronization, as described, for example, in U.S. Pat. No. 7,454,166 which describes the master frame synchronization of the XM satellite radio signal. In this latter case, once again, only the master site need receive the SDARS signal. However, one or more slave sites may also be equipped with GPS receivers, or SDARS receivers, for system redundancy.

By using a received SDARS signal, or a GPS signal, for example, a master site can achieve a half millisecond accuracy. Because in most urban canyons GPS is more difficult to receive than SDARS (for the very reasons described above), in major city downtown areas, it can be more preferable to use SDARS signals and/or other available signals to synchronize the master site. This is especially true where the SDARS system operates numerous terrestrial repeaters, such as in urban canyons and other areas where GPS (and other satellite) signals are weak or sparse.

Once the master site transmits a pulse, the stations down the street, or in the area, can receive that pulse and then compute the launch timing for when to send their transmissions. This is because they know the location of the site they are receiving from because every site in the area can be provided with the matrix of sites. Thus, upon receiving a pulse precisely at time t1, and knowing the distance to that pulse's originator, each site can calculate the exact time of flight and therefore know exactly when that pulse was transmitted. (The time of flight is simply c, the speed of light, divided by the known distance to that pulse originator (known through the matrix of sites)). Subtracting the time of flight from the time the pulse was received gives that site the exact time that the pulse received at time t1 was launched from its originator, or t0.

This gives nanosecond accuracy in the synchronization of two sites by UWB signals. By "daisy chaining" to the remaining sites, one can get all the sites in synchronization. Once all the sites are launching synchronously, whatever positional signal a vehicle may receive, it knows that it is coming from a synchronous pulse launch (i.e., all UWB pulses are sent at the same time in this system, because the various transmitting sites are synchronized). It can then measure the timing differences between the receptions of various signals and can precisely determine where it is.

Moreover, because vehicles are passive in an exemplary downtown area outfitted with the present synchronization system, they are not transmitting—as would be required in some type of two-way communication system—thus reducing once again the potential for interference. This also means that there is no issue with capacity; because cars are passive, the present system and method can still work no matter how many vehicles are at a given intersection, even 2,000 or more, for example. It is noted that the UWB pulse is inert to the vehicles on the ground, and thus their presence does not interfere with UWB signals.

As can be understood from the above discussion, the only limiting factor on saturation is how many UWB transmitting stations you have in a given area, say downtown. In exemplary embodiments of the present subject matter those stations can be spaced apart such that the system will not run into any bandwidth issues at all. Moreover, in exemplary embodiments of the present subject matter, it can be a pulse train that is actually transmitted, not a single pulse. These can, for example, be transmitted in a way that the pulses can be added together to minimize noise. This gives a high signal to noise ratio that further increases the accuracy. Moreover, for example, the pulse train can be modulated with time so that the time between pulses in the train varies. There can be a pulse pattern from each site and each site can have a unique transmitted pattern with a certain time between pulses, such as, for example, the time between the first two pulses might be five nanoseconds, the time between the next two pulses might be ten nanoseconds, the time to the next pulse might be five microseconds again and the time to the next pulse might be thirty microseconds, for example. Thus, because each vehicle (as well as each of the plurality of transmitting sites) knows the signature patterns of all other sites in the matrix, it knows exactly where to look for the pulses and where to combine them. Thus, adjacent sites have different pulse train time patterns so they do not interfere with each other. For a very large area outfitted with the inventive set of transmitting sites, pulse patterns may be repeated for two sites, as long as they are significantly spaced apart from each other, so that their signals would not be confused, if needed. The line of sight range can typically vary from 100-400 m. Accordingly, in exemplary embodiments of the present subject matter, sites could reuse the same pulse signature if spaced 1000 m or more apart.

Coarse and Fine Synchronization for UWB Transmitting Sites

As noted above, in exemplary embodiments of the present subject matter a two-stage synchronization may be used. In a first stage a course synchronization may be accomplished with, for example, GPS or SDARS, or even the terrestrial broadcast system of an SDARS service, such as Sirius XM Radio Inc.'s terrestrial repeaters. These methods can be used in a downtown area to deliver information to a vehicle or receiver within approximately half a millisecond of absolute accuracy for launch timing. This initial, or coarse, stage may be followed by a second stage, which is a high resolution synchronization where one nanosecond pulses are used from the master site out to resynchronize the downline transmitters in a "daisy chain", as described above, using the UWB spectrum, and in particular, during those portions of the absolute second allocated to UWB transmitters on a priority basis, for example as shown in FIG. 2. The downline transmitters are all synchronized based on (i) knowing their precise locations, and (ii) utilizing the known the time of flight, which may be calculated using c, the speed of light (and all electromagnetic radiation).

Basically this is a two-stage synchronization, where the position can be determined based upon the broadcast of the ultra-wide band signals, thus obviating round trip communications. FIGS. 3-6, next described, illustrate these exemplary synchronization methods.

Figure 3A:
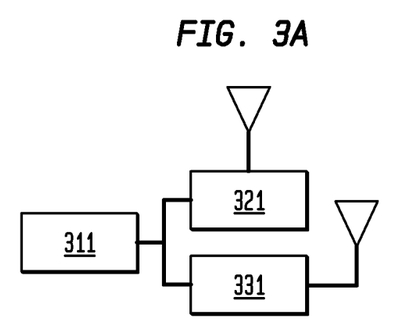
FIGS. 3A, 3B, and 3C depict exemplary synchronization pulses that may be received by exemplary vehicles according to exemplary embodiments of the present subject matter.

In exemplary embodiments of the present subject matter, each UWB transmitter site provides (i) coarse synchronization to insure that transmissions stay within the allocated time slots with respect to UTC or GPS time and (ii) fine synchronization to align the site to site transmission launch time which is required to enable mobile units receiving the transmissions to accurately determine their position using time of flight of the received UWB pulses. In such embodiments, the UWB network can assign one site as the coarse timing master which will align its transmissions with UTC or GPS time. FIG. 3A is a block diagram of a master site in an exemplary UWB network which uses a GPS receiver 321 to acquire coarse synchronization to set the network's transmissions to align with UWB timeslots, as described with reference to FIG. 2. The UWB transceiver 331 outputs a timing pulse every second which is synchronous with the GPS time received from the GPS satellite constellation. A controller 311 can receive this pulse and use the pulse timing to control the master site transmission launch timing. It is here noted that since the transmission time slots in FIG. 2 will normally include guard intervals to allow for nominal network timing errors and to insure transmissions do not overlap due to propagation delays, the transmission launch timing specification is not required to be significantly tighter than +/−100 usec (microseconds).

Figure 3B:
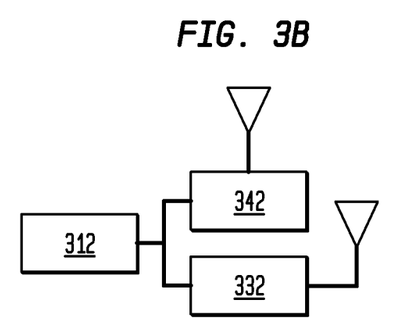

FIG. 3B depicts a block diagram of an alternate master site which uses a satellite radio signal (e.g., SDARS) to derive UTC or GPS time for aligning the network transmissions. In FIG. 3B, the satellite receiver 342 outputs a frame timing pulse which has a fixed relationship with GPS time. The controller 312 receives the frame timing pulse and derives GPS time which is then used to synchronize the UWB transmissions via the UWB transceiver 332. The advantage of the configuration in FIG. 3B is the satellite receiver may also provide a satellite delivered control channel to provide network configuration information, such as, for example, specifying which site is to act as the master or to provide location coordinates or transmission codes, or signature pulse trains, for new sites or modified sites.

Figure 3C:
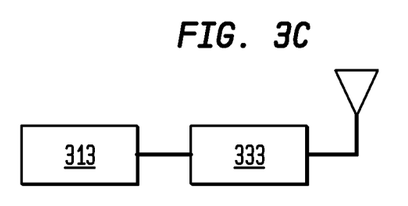

Finally, FIG. 3C is a block diagram which presents the minimum requirements for a slave site. Each slave site can be provided with a controller 313 that derives its transmission timing by receiving UWB transmissions (via UWB transceiver 333) from other sites, such as those of FIGS. 3A and 3B, as described herein. The slave sites may optionally also include a GPS or satellite receiver, with the requisite software to decode these signals. If they do, they can be upgraded to master sites themselves if needed, at some future point in time.

Figure 4:
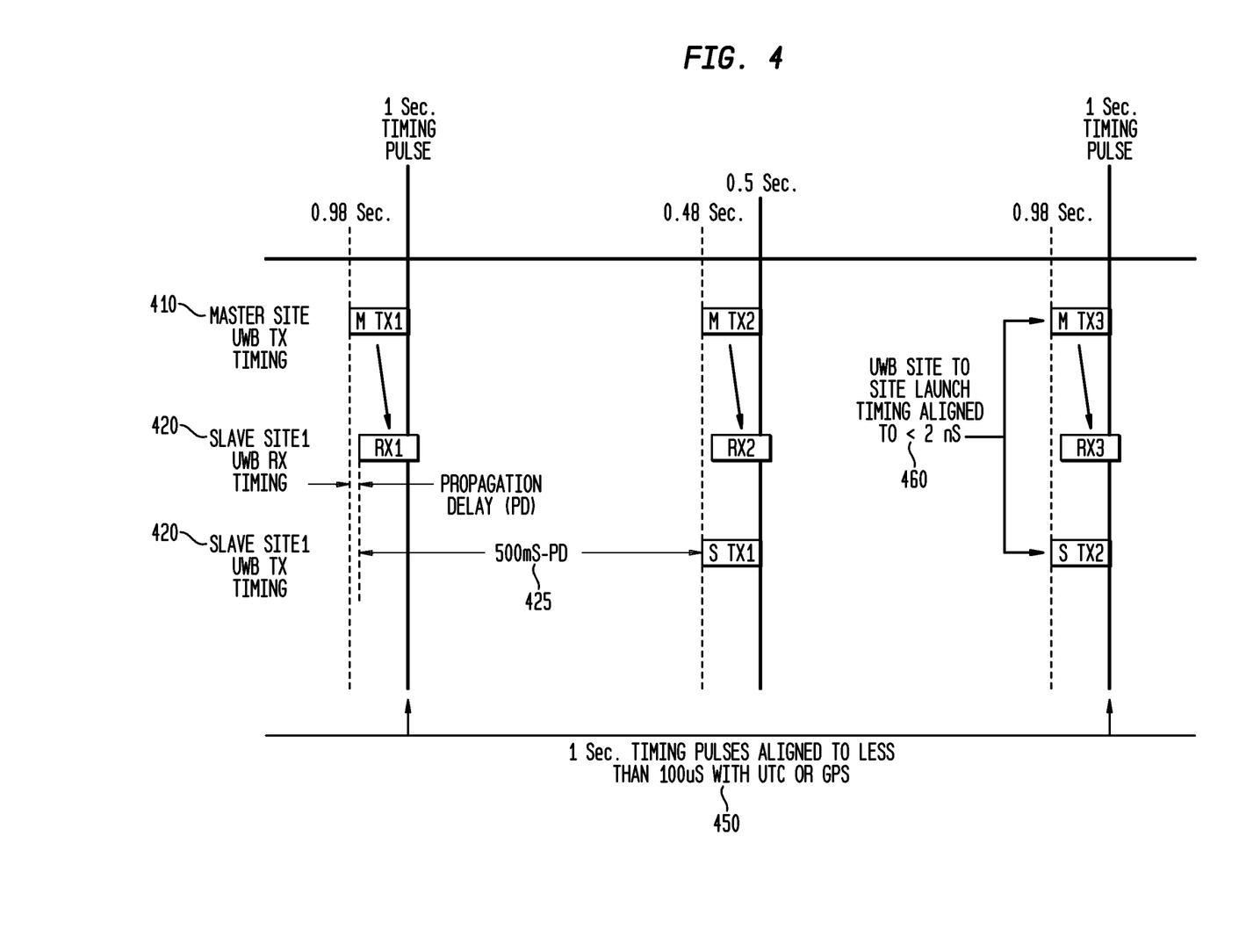
FIG. 4 is a timing diagram showing an exemplary method for establishing over the air network transmission synchronization according to exemplary embodiments of the present subject matter.

FIG. 4 is a timing diagram which illustrates an exemplary method for establishing over the air network transmission synchronization in various exemplary embodiments of the present subject matter. Time is plotted on the X-axis with the time slots described in FIG. 2 included (not to scale) for exemplary and illustration purposes. In FIG. 4, the 1 Sec. timing pulse 450 is synchronous with GPS or UTC time. The Master Site 410 receives the 1 Sec. timing pulse from GPS (or SDARS) and uses an internal time base to set the UWB transmission launch timing at 480 Msec and 980 Msec after the 1 sec timing pulse. The Master Site may deploy a highly accurate time base to remove short term jitter from the 1 second timing pulses to stabilize the launch timing of the UWB transmissions. The Master Site 410 UWB transmissions in time are shown as M TX1, M TX2 and M TX3. Slave Site1 420 is in line of sight range of the Master Site 410. Slave Site1 420 maintains a location database which includes its own location and the locations of nearby sites. This database may be preloaded, for example, or acquired and updated over the air via UWB, satellite, Wi-Fi or other communication means. Slave Site 1 420 receives transmission M TX1 from Master Site 410 at time window RX1. Slave Site1 420 can be configured to resolve the reception time of RX1 to nanosecond level accuracy and to derive the time of flight or propagation delay (PD) for the UWB transmission to travel from the Master Site 410 to Slave Site1 420. This can be achieved using, for example, UWB receiver and analysis technology that are currently available. Various other technologies dealing with UWB ranging and processing can also be used.

Based on the site locations, the distance d between the sites can be determined and the propagation delay (the time to travel between Master Site 410 and Slave Site 1 420) can then be computed by dividing the distance d by the speed of light c, as follows:

Propagation Delay (PD)=Distance (*d*)/*c*.

By subtracting the propagation delay, PD, from its reception time of M TX1, Slave Site1 420 can accurately determine the time at which Master Site 410 launched UWB transmission M TX1. Slave Site1 420 can then accurately synchronize its UWB transmissions to Master Site 410 by using an internal timebase to set its UWB transmission launch timing to {500 msec less the propagation delay} (shown as 425 in FIG. 4) after the M TX1 reception time (RX1). The UWB Tx Timing is shown in the bottom row of FIG. 4. Additionally, Slave Site1 may average the reception time over multiple reception windows to reduce jitter in the transmit timing. If Master Site 410 is not within line of sight distance of Slave Site1 420, the UWB transmission timing could be acquired using transmissions received from any other Slave Site within line of sight, provided that the location of that other Slave Site is known so that an accurate propagation delay from it may be calculated. With this synchronization method the site to site launch timing of UWB transmissions can be aligned to better than 2 nsec as shown at 460 in FIG. 4, which is required for receivers traveling in the UWB network to derive accurate location information from the UWB transmissions. It is noted that with c=3×10$^8$ m/s, every 1 nanosecond represents 0.3 m.

Figure 5:
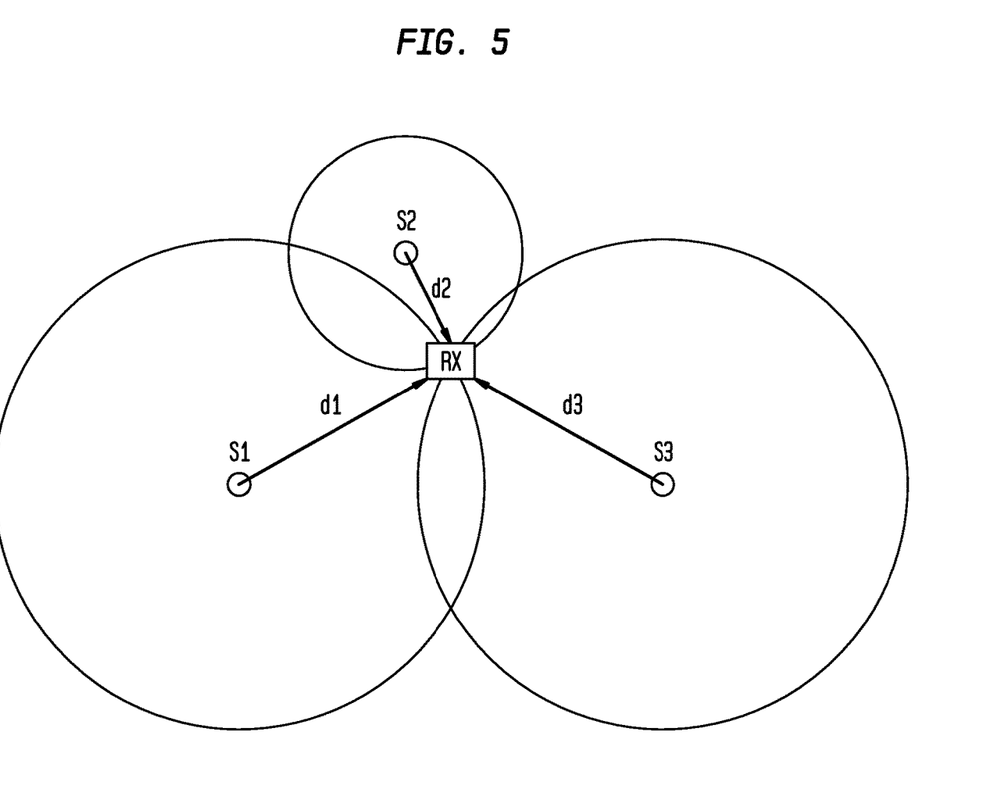
FIG. 5 depicts a simplified planar example of how a mobile unit traveling in a UWB network can determine its location by receiving the line of sight UWB transmissions.

FIG. 5 shows a simplified planar example of how a mobile unit traveling in the UWB network can determine its location by receiving various line of sight UWB transmissions. S1, S2 and S3 are UWB transmission sites in the network, as described above. RX is a mobile receive unit traveling in the UWB network. RX is located at a line of sight distance of d1 from S1, d2 from S2 and d3 from S3. It is noted that S2 is the closest UWB site to RX. With S1, S2 and S3 launching their UWB transmissions simultaneously, using the synchronization methods described above, RX first receives the transmission from S2 at time t0, followed by the transmissions from S1 and S3 at times t0+ts1 and t0+ts3, respectively. RX is able to accurately measure the differential receive time ts1 between S2 and S1 and ts3 between S2 and S3. The differential receive times are converted to differential distance between d2 and d1, d21=c*ts1, as well as the differential distance between d2 and d3, d23=c*ts3 where c is the speed of light. The locations of S1, S2 and S3 are known to RX either from a preloaded table or from information contained in the UWB transmission or other communication means (such as, for example, an SDARS informational channel). With RX located at unknown position X,Y in range of the UWB network, and with the site locations known to RX as {X1,Y1} for S1, as {X2,Y2} for S2 and as {X3,Y3} for S3, the location for RX may be computed by solving for X, Y and d2 in the following 3 equations:

$$((X2-X)2+(Y2-Y)2)1/2=d2, \quad\quad\quad 1)$$

$$((X1-X)2+(Y1-Y)2)1/2=d2+d21, \quad\quad\quad 2)$$

and $$((X3-X)2+(Y3-Y)2)1/2=d2+d23. \quad\quad\quad 3)$$

It is further understood that those skilled in the art may easily configure the network to provide a 3D location by including a Z value (or height component) in the site locations, and thus precise distances in 3D space between sites, or between a vehicle and various sites, may be measured.

Figure 6:
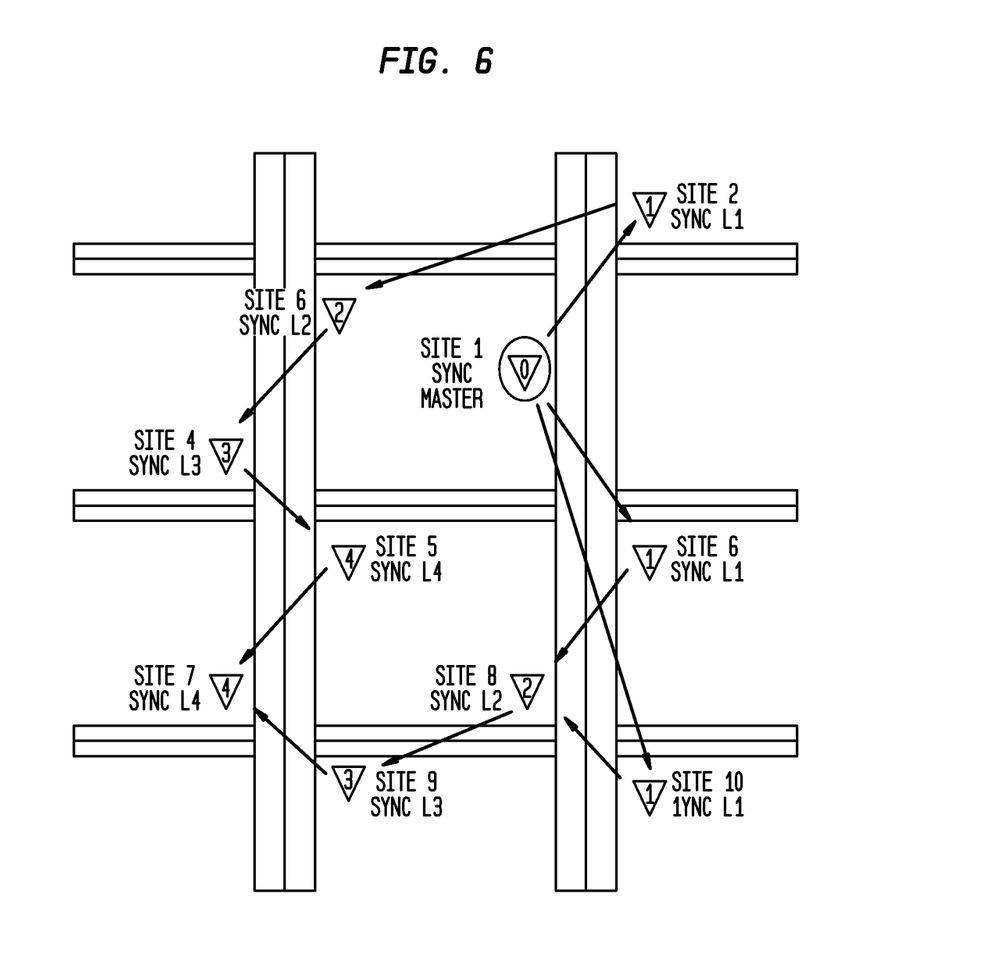
FIG. 6 is a diagram of an urban street grid with an exemplary UWB deployment consisting of ten (10) transmission sites mounted on street lights according to exemplary embodiments of the present subject matter.

Finally, FIG. 6 is a diagram of an exemplary urban street grid with an exemplary UWB deployment consisting of 10 transmission sites mounted on street lights. Site 1 has been designated as the sync master and initiates UWB transmissions in the system once it has obtained GPS or UTC time synchronization, as noted above. Sites 2-10 are Slave Sites which do not initiate transmissions until sync has been acquired from another UWB site within line of sight. In this example, sites 2, 6 and 10 are in line of sight of the Master Site and can thus acquire synchronization directly from the master. These sites are defined as having Level 1 synchronization because synchronization with the Master Site was acquired with one transmission path. Sites 2 and 3 are in line of sight with each other and Site 3 acquires its synchronization from Site 2. Site 3 has Level 2 synchronization as synchronization with the Master Site was acquired via two transmission paths.

Similarly, the remaining sites acquire their synchronization using the line of sight transmission paths designated by the various arrows, namely Site 4 acquires its synchronization from Site 3, Site 5 acquires its synchronization from Site 4, and Site 9 acquires its synchronization from Site 8. The synchronization paths may be defined during the network planning phase and stored in or downloaded to each site, or may be defined dynamically using self-organizing algorithms; but in general the synchronization level should be minimized for each site in order to reduce the buildup of timing errors from each transmission path. When a site has multiple line of sight options for synchronization such as Site 8, in line of sight to both Sites 6 and 10, or Site 7, in line of sight to both Sites 5 and 9, averaging algorithms may be deployed to minimize timing errors. If such algorithms are not employed, for example, then a site could acquire its synchronization from the lowest level transmitting site available to it, to minimize the buildup of timing errors, as above. The synchronization level or path history may be included in the UWB transmission for use by network self-synchronization algorithms or by receiver algorithms which estimate or optimize the reported location accuracy.

Exemplary Systems

In exemplary embodiments of the present subject matter, any suitable programming language can be used to implement the routines of particular embodiments including C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

Particular embodiments may, as noted, be implemented in an SDARS receiver in a vehicle, in combination with UWB equipment. Other components are fixed UWB master and slave sites provided in a geographical area, where the master site has at least one of a SDARS receiver and a GPS receiver, and a slave site may have one or both of those, but need not. Such equipment may include hardware, software, middleware and firmware, as maybe appropriate.

It will also be appreciated that one or more of the elements depicted in the drawings can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout any claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although various methods, systems, and techniques have been described herein, the scope of coverage of this patent is not limited thereto. To the contrary, this patent is understood to cover all methods, systems, and articles of manufacture fairly falling within the scope of the appended claims

What is claimed:

1. A method of transmitting synchronized ultra-wideband (UWB) position determination signals, comprising:
    a first stage in which course synchronization is accomplished at a master UWB transmitter site; and
    a second high resolution synchronization stage wherein one nanosecond pulses are used from the master site out to synchronize one or more UWB slave sites;
    wherein the one or more slave sites each are provided with the co-ordinates of the master site and all other slave sites, and wherein upon receiving the pulses from either the master or another slave site, each can calculate when the pulses were sent by their originating site.

2. The method of claim 1, wherein the master site acquires Global Positioning System (GPS) time in the first stage.

3. The method of claim 1, wherein the master site acquires a timing signal from a Satellite Digital Audio Radio Services (SDARS) service in the first stage, either from a satellite, or a terrestrial repeater.

4. The method of claim 1, wherein in the second stage one nanosecond pulses are sent from the master site out to resynchronize the slave sites in a "daisy chain" manner.

5. The method of claim 4, wherein the nanosecond pulses sent by each of the master and slave sites are differentiated one from another such that a receiver can distinguish which site is transmitting which set of pulses.

6. The method of claim 5, wherein the nanosecond pulses sent by each site are distinguished from one another by varying the time intervals between successive pulses.

7. The method of claim 1, wherein pulse trains are sent during a time interval when UWB devices have primary use of the UWB spectrum, pursuant to a time sliced spectrum sharing schema.

8. The method of claim 7, wherein the synchronization level is minimized for each slave site in order to reduce the buildup of timing errors from each transmission path.

9. The method of claim 1, wherein one or more of the slave sites averages the reception time from the master or from other slave sites over multiple reception windows to reduce jitter in the transmit timing.

10. The method of claim 1, wherein the synchronization paths for the one or more slave sites are defined during the network planning phase and stored in or downloaded to each site, or are defined dynamically using self-organizing algorithms.

* * * * *